United States Patent
Claassen et al.

(10) Patent No.: US 7,366,746 B2
(45) Date of Patent: Apr. 29, 2008

(54) FINITE IMPULSE RESPONSE FILTER METHOD AND APPARATUS

(75) Inventors: Stuart L. Claassen, Santa Clara, CA (US); Jon Q. J. Pocock, Mountain View, CA (US)

(73) Assignee: Xerox Corporation, Norwalk, CT (US)

( * ) Notice: Subject to any disclaimer, the term of this patent is extended or adjusted under 35 U.S.C. 154(b) by 924 days.

(21) Appl. No.: 10/776,509

(22) Filed: Feb. 12, 2004

(65) Prior Publication Data

US 2005/0182803 A1 Aug. 18, 2005

(51) Int. Cl.
*G06F 17/10* (2006.01)

(52) U.S. Cl. .................................. 708/300; 708/309

(58) Field of Classification Search ............... 708/300, 708/319

See application file for complete search history.

(56) References Cited

U.S. PATENT DOCUMENTS

| | | | | |
|---|---|---|---|---|
| 4,573,136 | A | * | 2/1986 | Rossiter .................... 708/603 |
| 4,679,164 | A | * | 7/1987 | Rearick ..................... 708/420 |
| 4,709,343 | A | * | 11/1987 | Van Cang .................. 708/301 |
| 4,849,914 | A | | 7/1989 | Medioni et al. |
| 4,998,288 | A | | 3/1991 | Bui et al. .................... 382/54 |
| 5,117,385 | A | * | 5/1992 | Gee ........................... 708/625 |
| 5,255,216 | A | * | 10/1993 | Blanz et al. ................ 708/625 |
| 5,515,452 | A | | 5/1996 | Penkethman et al. |
| 5,524,090 | A | * | 6/1996 | Iwamura .................... 708/625 |
| 5,563,816 | A | * | 10/1996 | Golla et al. ................. 708/319 |
| 5,583,659 | A | | 12/1996 | Lee et al. |
| 5,745,596 | A | | 4/1998 | Jefferson |
| 5,862,059 | A | * | 1/1999 | Matula et al. .............. 708/270 |
| 5,900,953 | A | | 5/1999 | Bottou et al. |
| 6,058,214 | A | | 5/2000 | Bottou et al. |
| 6,243,729 | B1 | * | 6/2001 | Staszewski ................. 708/319 |
| 6,324,305 | B1 | | 11/2001 | Holladay et al. |
| 6,343,154 | B1 | | 1/2002 | Bottou et al. |
| 6,400,844 | B1 | | 6/2002 | Fan et al. |
| 6,487,190 | B1 | * | 11/2002 | Regis ......................... 370/342 |
| 6,633,670 | B1 | | 10/2003 | Matthews |
| 2002/0152250 | A1 | * | 10/2002 | Staszewski ................. 708/319 |

FOREIGN PATENT DOCUMENTS

| | | |
|---|---|---|
| EP | 0 712 094 A2 | 5/1996 |
| EP | 1 006 716 A2 | 6/2000 |

OTHER PUBLICATIONS

R. De Queiroz, "Compression of Compound Documents," *IEEE*, Oct. 1999, pp. 209-213.
U.S. Appl. No. 10/187,499, filed Jul. 1, 2002, Curry et al.
U.S. Appl. No. 10/188,026, filed Jul. 1, 2002, Curry et al.
U.S. Appl. No. 10/188,249, filed Jul. 1, 2002, Curry et al.
U.S. Appl. No. 10/188,277, filed Jul. 1, 2002, Curry et al.
U.S. Appl. No. 10/188,157, filed Jul. 1, 2002, Curry et al.

(Continued)

*Primary Examiner*—Tan V. Mai
(74) *Attorney, Agent, or Firm*—Oliff & Berridge, PLC

(57) ABSTRACT

Finite response filters (FIRs) are divided into partial filters that filter a same portion of image data to generate partial filtered results. The partial filtered results may be saved and later retrieved to generate complete filter outputs.

16 Claims, 9 Drawing Sheets

OTHER PUBLICATIONS

U.S. Appl. No. 10/612,250, filed Jul. 1, 2003, Curry et al.
U.S. Appl. No. 10/612,057, filed Jul. 1, 2003, Curry et al.
U.S. Appl. No. 10/612,234, filed Jul. 1, 2003, Curry et al.
U.S. Appl. No. 10/612,461, filed Jul. 1, 2003, Curry et al.
U.S. Appl. No. 10/612,062, filed Jul. 1, 2003, Curry et al.
U.S. Appl. No. 10/612,261, filed Jul. 1, 2003, Curry et al.
U.S. Appl. No. 10/612,246, filed Jul. 1, 2003, Curry et al.
U.S. Appl. No. 10/612,368, filed Jul. 1, 2003, Curry et al.
U.S. Appl. No. 10/612,248, filed Jul. 1, 2003, Curry et al.
U.S. Appl. No. 10/612,063, filed Jul. 1, 2003, Curry et al.
U.S. Appl. No. 10/612,064, filed Jul. 1, 2003, Curry et al.
U.S. Appl. No. 10/612,084, filed Jul. 1, 2003, Curry et al.
U.S. Appl. No. 10/776,515, filed Feb. 12, 2004, Curry et al.
U.S. Appl. No. 10/776,514, filed Feb. 12, 2004, Curry et al.
U.S. Appl. No. 10/776,608, filed Feb. 12, 2004, Curry et al.
U.S. Appl. No. 10/776,602, filed Feb. 12, 2004, Curry et al.
U.S. Appl. No. 10/776,620, filed Feb. 12, 2004, Curry et al.
U.S. Appl. No. 10/776,603, filed Feb. 12, 2004, Curry et al.
U.S. Appl. No. 10/776,612, filed Feb. 12, 2004, Curry et al.
U.S. Appl. No. 10/776,508, filed Feb. 12, 2004, Curry et al.
U.S. Appl. No. 10/776,516, filed Feb. 12, 2004, Curry et al.
J. Stein: "Digital Signal Processing, A Computer Science Perspective: Chapter 15 Digital Filter Implementation" 2000 Wiley, XP002331840, ISBN: 0-471-29546-9, pp. 584-589; Figures 15.9, 15.10.
D. A. Parker et al.: "Low-Area/Power Parallel FIR Digital Filter Implementations" Journal of VLSI Signal Processing Systems for Signal, Image, and Video Technology, Kluver Academic Publishers, Dordrecht, NL, vol. 17, No. 1, Sep. 1997, pp. 75-92, XP000701964, ISSN: 0922-5773, pp. 77-78, Figure 2.
J.H. Arbeiter: "Multidimensional video Image Processing Architecture", Optical Engineering, Soc. of PhotoOptical Instrumentation Engineers. Bellingham, US, vol. 25, No. 7, Jul. 1986, pp. 875-880, XP000563305, ISSN: 0091-3286, pp. 877-878.

* cited by examiner

|   |   |   |   |   |   |   |   |   |
|---|---|---|---|---|---|---|---|---|
| 0 | 0 | 0 | 0 | 0 | 0 | 0 | 0 | 0 |
| 0 | 1 | 2 | 3 | 4 | 3 | 2 | 1 | 0 |
| 0 | 2 | 4 | 6 | 8 | 6 | 4 | 2 | 0 |
| 0 | 3 | 6 | 9 | 12 | 9 | 6 | 3 | 0 |
| 0 | 4 | 8 | 12 | 16 | 12 | 8 | 4 | 0 |
| 0 | 3 | 6 | 9 | 12 | 9 | 6 | 3 | 0 |
| 0 | 2 | 4 | 6 | 8 | 6 | 4 | 2 | 0 |
| 0 | 1 | 2 | 3 | 4 | 3 | 2 | 1 | 0 |
| 0 | 0 | 0 | 0 | 0 | 0 | 0 | 0 | 0 |

FINITE IMPULSE RESPONSE FILTER METHOD AND APPARATUS

BACKGROUND OF THE INVENTION

1. Field of Invention

This invention is directed to a finite response filter (FIR) method and apparatus.

2. Related Art

FIR filters are used in many fields such as document reproduction or printing of documents, for example. Almost all printed matter uses halftone screens. These halftone screens are traditionally optimized for the printing device, and may cause considerable halftone interference, such as visible large-area beating and visible Moire patterns, if not properly removed from the original scanned image. Image data generated by scanning printed matter is often filtered to remove unwanted artifacts, such as halftone screens. The suppression of halftones is especially important for color documents, since these are typically printed with four or more color separations containing slightly different screens at different angles and or frequencies, and these may interact with each other to cause undesirable spatial artifacts.

SUMMARY OF THE DISCLOSURE

A system and method for filtering image data is provided that takes advantage of FIR filter properties. For example, a two-dimensional triangular FIR filter having N×N coefficients can be applied to image data so that consecutive output pixels are generated by processing N×N blocks of image data pixels shifted a constant number of pixels from each other. Coefficients of such a filter may be divided into four quad portions, each quad portion corresponding to a quadrant of the N×N coefficients. Each of the four quad portions of coefficients may be used to separately generate a partial filter result for a single N/2×N/2 block of image data. The partial filtered results may be stored in a memory and later retrieved to generate complete filter outputs. Such a filter process may be applied to de-screening image data in document processing applications, for example.

BRIEF DESCRIPTION OF DRAWINGS

The systems and methods of this invention are described in detail, with reference to the following figures, wherein:

FIG. 2 illustrates an exemplary zero padded filter coefficients to convert odd Ns to an even number;

FIG. 3 illustrates dividing the padded filter coefficients of FIG. 2 into four quad portions forming four quad filters;

DETAILED DESCRIPTION

As is well known, two-dimensional FIR filters may he used to filter image data. When applying such a filter that has N×N coefficients, image data pixels corresponding to an N×N block is multiplied by appropriate coefficients and the products summed to generate a single filter output pixel. When the coefficients are symmetrical about a central point, the filter coefficients may be divided into quadrants and each of the quadrants (a quad filter) may be applied to an N/2×N/2 block of the image data separately to generate partial filtered results. These partial filtered results may be combined to form complete filter outputs without again accessing all corresponding pixels of the N×N block of the image data.

Figure 1:
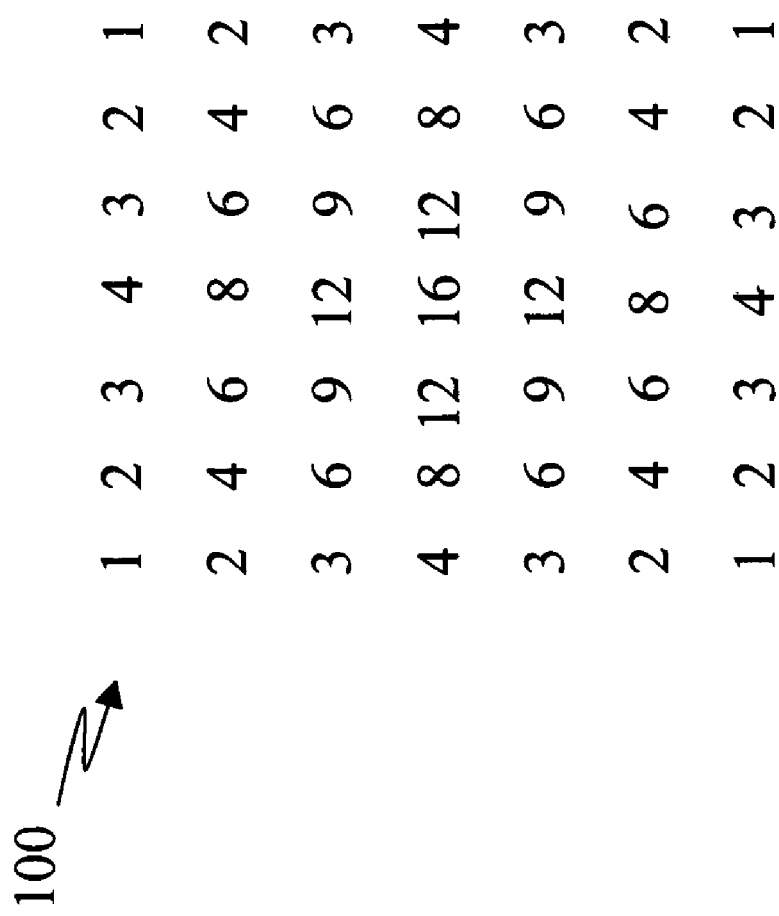
FIG. 1 illustrates exemplary coefficients of a two-dimensional triangular filter with a span N of seven.
Figure 3:
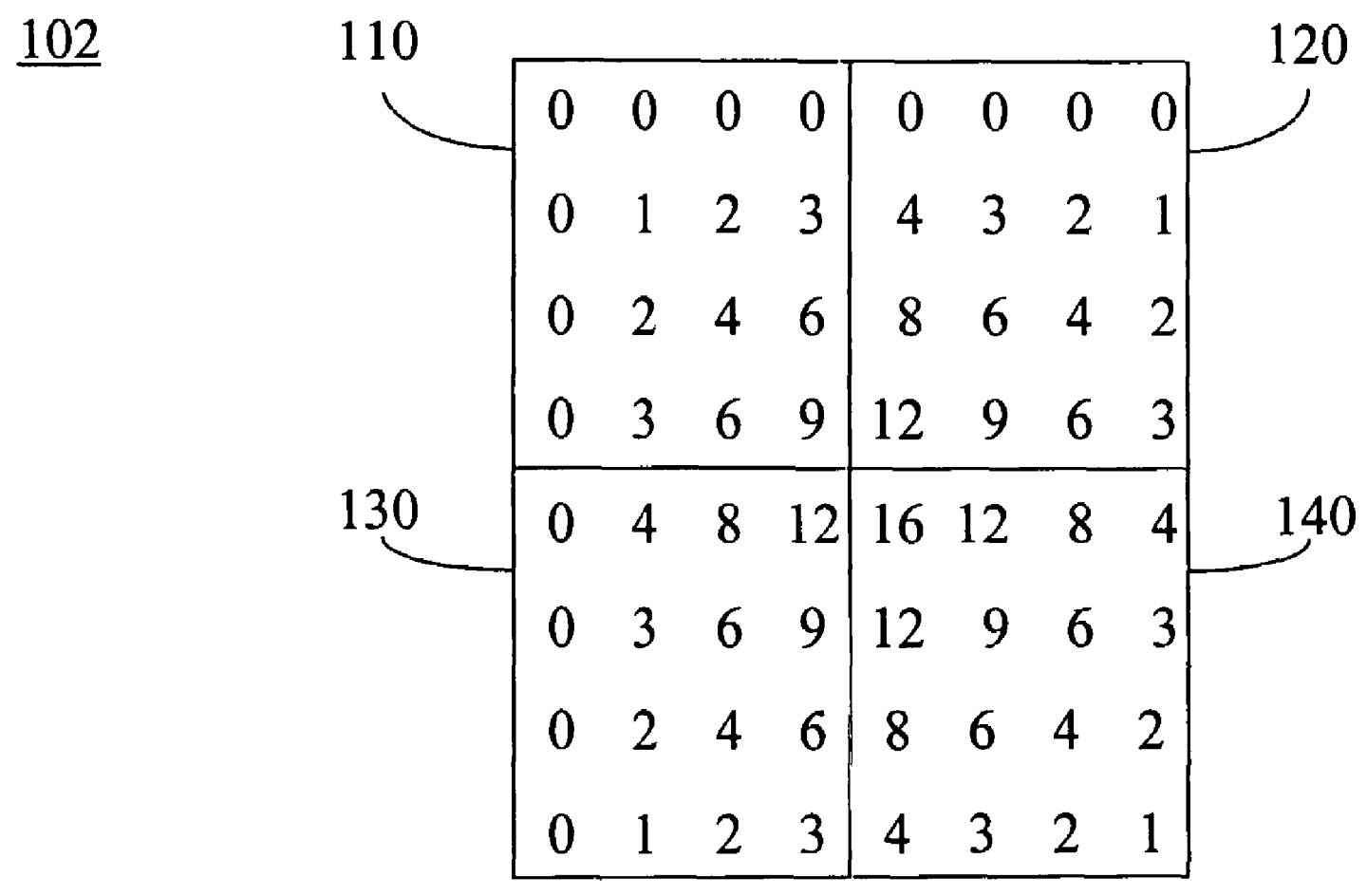

FIG. 1 shows coefficients 100 of an exemplary two-dimensional triangular FIR filter. While the coefficients 100 corresponds to an odd N that equals 7, N can be any number, even or odd, such as 30 or 31, for example. When N is even and the coefficients are symmetrical about the center, the coefficients may be divided into 4 quad portions of N/2×N/2 blocks, and each of the quad portions may be separately applied as a quad filter to N/2×N/2 blocks of image data. However, if N is odd, as shown in FIG. 1, then a row of zeros (0) and a column of zeros (0) may be added (zero padding), as shown in FIG. 2, and the N+1×N+1 block of coefficients 102 may be divided into 4 (N+1)/2×(N+1)/2 quad portions 110, 120, 130 and 140 as shown in FIG. 3. While FIG. 2 shown the row and column of zeros padded at the top and left sides of the N×N coefficients, right and bottom sides may zero padded instead of the top and left sides.

Figure 4:
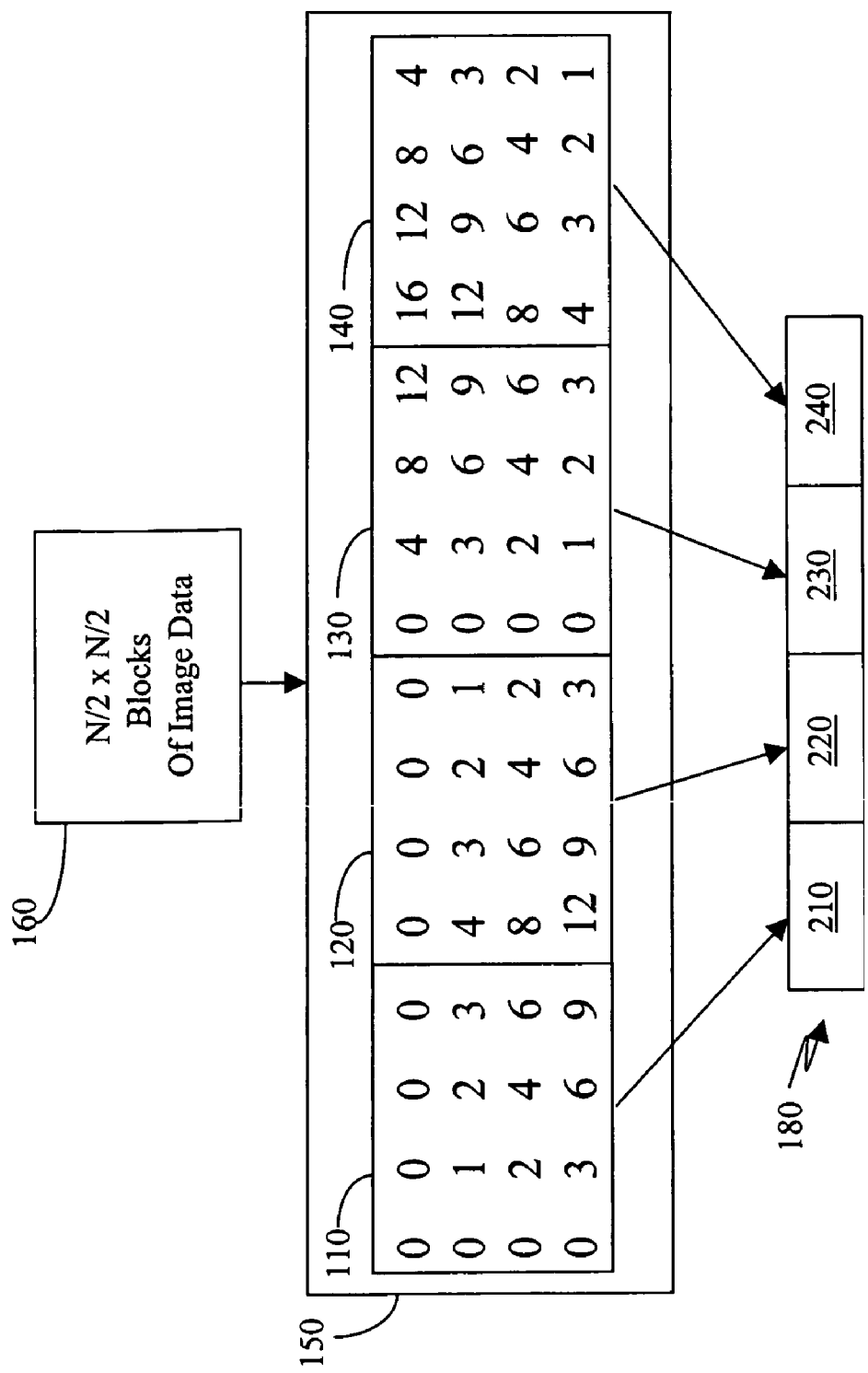
FIG. 4 illustrates applying the quad filters to an N/2×N/2 block of image data pixels.

FIG. 4 shows a single filter process that filters N/2×N/2 blocks of pixels 160 of the image data generating partial filtered results 210-240 using the 4 quad portions 110-140 as coefficients of 4 quad filters. The four quad filters may be combined into a single partial filter 150, as an example. The partial filter 150 processes on each of the N/2×N/2 blocks of pixels 160 of the image data to generate the 4 partial filtered results 210-240 (which is also collectively referenced as partial filtered results 180). These partial filtered results 180 may be stored in a memory for later retrieval and combined to generate complete filter results. Different ones of the partial filtered results 210-240, generated by the partial filter 150 from the same N/2×N/2 block, are combined with partial filtered results 210-240 of other N/2×N/2 blocks to generate complete filter outputs.

If the number of complete filter output pixels is required to match the number of pixels in the image data, then (N/2)−1 pixels along a perimeter of an image area corresponding to the image data may be replicated along edges of the image area; and every N/2×N/2 block of the expanded image data may be processed to generate the complete filter output. However, the amount of information in the complete filter output is less than that in the original image data because information was filtered out by the filter process. Thus, fewer pixels are required to represent the contained information. Accordingly, a number of pixels in the complete filter output may be reduced or decimated by sub-sampling by a factor $k^2$:1, for example. The sub-sampling may be accomplished by selecting N/2×N/2 blocks of pixels that are shifted from each other by k pixels. For example, if the image data was obtained by scanning a document, the N/2×N/2 blocks may be shifted in a fast scan direction (from left to right) by k pixels increments. When the edge of the image area is reached, the left most N/2×N/2 block shifted downward by k pixels may be selected to begin another pass in the fast scan direction.

Figure 5:
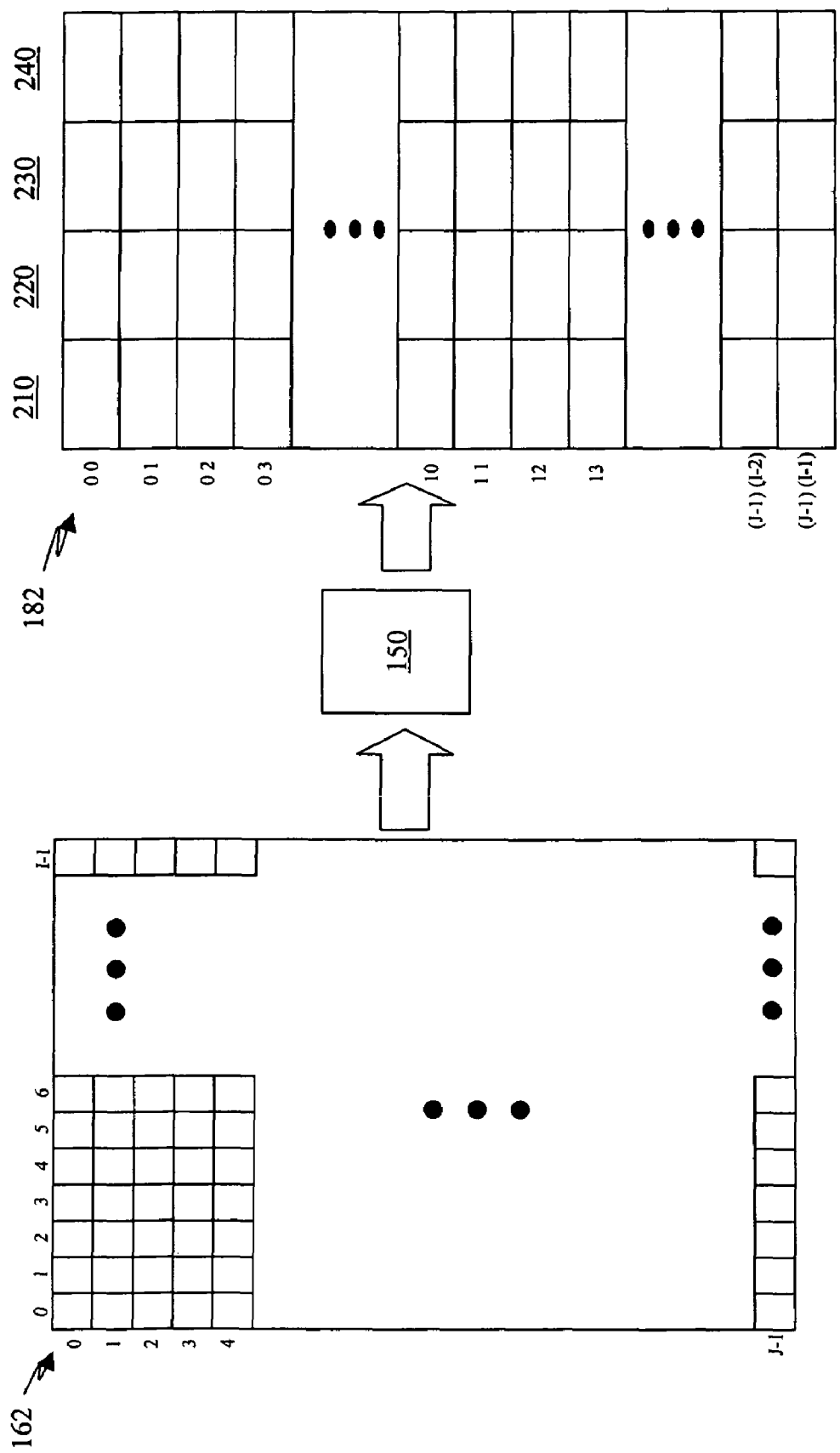
FIG. 5 shows an exemplary process of quad filtering the image data.

FIG. 5 shows the partial filter 150 when applied to the image data when k=N/2. Image data 162 is shown divided into N/2×N/2 blocks with indexes at the top and left sides for each N/2 increment. Using the notation (left index top index) to refer to a particular N/2×N/2 block, (0 0) refers to the top left N/2×N/2 block; (0 (I-1)) refers to the top right most N/2×N/2 block; ((J-1) 0) refers to the left most bottom N/2×N/2 block; and ((J-1) (I-1)) refers to the right most bottom N/2×N/2 block.

The N/2×N/2 blocks of the image data 162 are filtered by the partial filter 150 to, generate partial filtered results 182 indexed by the N/2×N/2 block indexes (j i). Thus, partial filtered results 210-240 of (0 0) corresponds to the (0 0) N/2×N/2 block in the image data 162. The partial filter 150 may process the image data 162 along a fast scan direction (left to right) N/2×N/2 block at a time until the right edge of the image data 162 is reached, and then begin again at the left most N/2×N/2 block one N/2×N/2 block down in the slow scan direction, for example. Thus, N/2×N/2 blocks (0 0) to (0 (I-1)) blocks are processed by the partial filter 150 from left to right, then (1 0) to (1 (I-1)) are processed next to generate the partial filtered results 182.

Figures 6, 7:
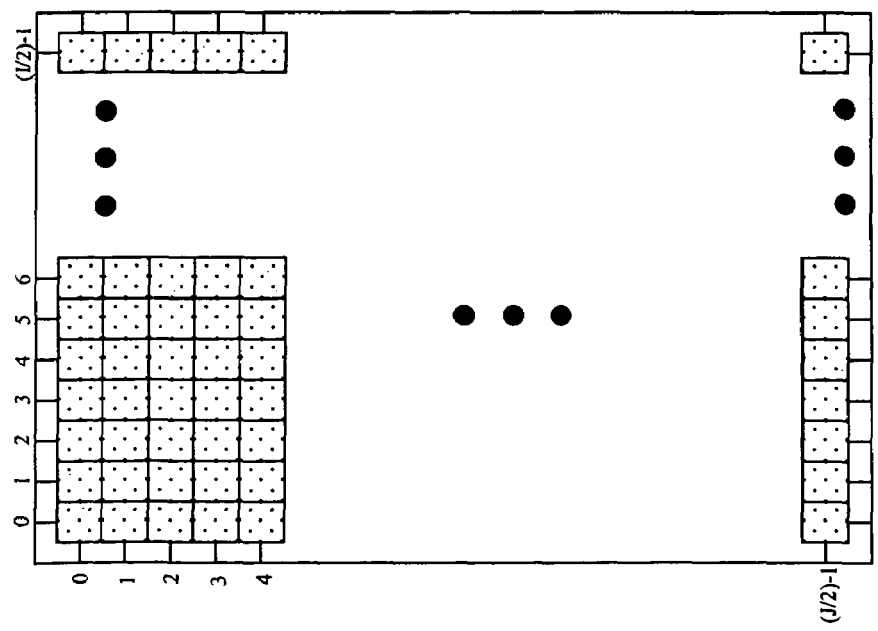
FIGS. 6 and 7 show an exemplary relationship between N/2 blocks and filter outputs.

FIG. 6 shows an exemplary diagram of the image data 162 of FIG. 5 overlaid with corresponding filtered output pixels (squares filled with dots) The top and left numbers index the output pixels. Thus, filtered output pixel (0 0) is generated by combining partial filtered results corresponding to N/2×N/2 blocks (0 0), (0 1), (1 0) and (1 1) shown in FIG. 5. FIG. 7 shows the partial filtered results 210-240 that are combined for each of the filtered output pixels (0 0), (0 1), (0 2), (1 0), (1 1) and 1 2). Thus, the top left most filtered output pixel is generated by:

1) multiplying each of the coefficients 210 by pixel values of the (0 0) N/2×N/2 block of the image data and summing the products;
2) multiplying each of the coefficients 220 by pixel values of the (0 1) N/2×N/2 block of the image data and summing the products;
3) multiplying each of the coefficients 230 by pixel values of the (1 0) N/2×N/2 block of the image data and summing the products;
4) multiplying each of the coefficients 240 by pixel values of the (1 1) N/2×N/2 block of the image data and summing the products; 5) summing all the sums of the products; and optionally
6) normalizing by dividing by the sum of all the coefficients 110-140.

The division in the normalization process made be made efficient if the sum of all the N×N coefficients is a power of 2, i.e., 4, 16, 32, etc. If so, the normalization may be performed by one or more binary right shifts. Thus, if the sum of the coefficients are 4, 16 or 32, right shifts of 2, 4 or 5 are performed for normalization. Rounding may be achieved by adding to the sum of the sums of the products a value equal to half the sum of all the coefficients before right shifting for the divide. Since the right shifts performs the division by the sum of the coefficients, adding one half the sum of the coefficients prior to the right shifts is effectively adding 0.5 to the division result.

If the sum of the coefficients is not a power of 2, then normalization may be approximated by multiplying the sum of the sums of the products by a fraction that has a denominator of a power of 2. In this case, normalization is achieved by one multiplication followed by one or more right shifts.

Figure 8:
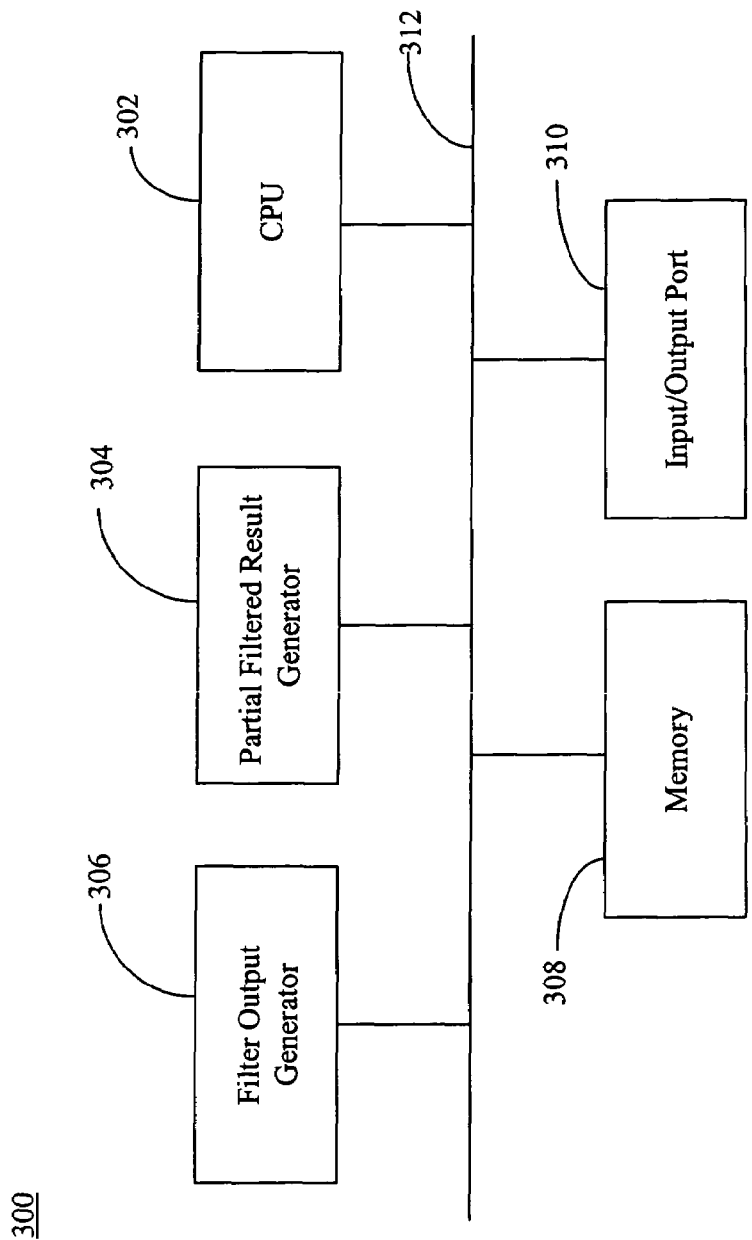
FIG. 8 shows an exemplary filter processor.

FIG. 8 shows an exemplary block diagram of a filter device 300 that filters the image data based on the quad filters described above. The filter device 300 includes a CPU 302, a partial filter result generator 304, a filter output generator 306, a memory 308 and an input/output port 310. All the components 302-310 are coupled together with a bus 312. The CPU 302 may include a control program that coordinates the functions of the other components 304-310 to perform the filter function.

While FIG. 8 shows a bus architecture, the filter device 300 may be implemented using any hardware structure that performs the needed functions. For example, the filter device may be implemented on a single application specific integrated circuit (ASIC), PLAs, and the like, or implemented in software as a program executing in a processor such as the CPU 302. The structure shown in FIG. 8 is used for ease of discussion.

Each of the quad filter coefficients 110-140 may be stored in the memory 308 together with their sums, a number of right shifts or a fraction expressed by a multiplier and a number of right shifts. The image data to be filtered may be received via the input/output port 310. For k=N/2, the image data may be received one N/2×N/2 block at a time and discarded after the partial filtered results are generated. Thus, each N/2×N/2 block of image data may be input and stored in the memory 308 until the partial filter result generator 304 completes generating all the partial filtered results 210-240 corresponding to the N/2×N/2 block of image data. If Input/output speeds are slow, a next N/2×N/2 block may be stored in the memory 308 while the partial filtered results are being generated by the partial filter result generator 304.

The input/output port 310 may input the N/2×N/2 blocks of image data in the fast scan and slow scan directions, as discussed above. Thus, referring to FIG. 5, N/2×N/2 blocks of the image data 162 may be input from left to right and top to bottom until all the image data (or as much as needed) is processed by the filter device 300.

When a new N/2×N/2 block of image data is received, the CPU 302 may command the Partial Filter Result Generator 304 to begin generating the partial filtered results. The partial filter result generator 304 may generate the 4 partial filtered results 210-240 by multiplying the quad coefficients 110-140 with the corresponding image data of the stored N/2×N/2 block, summing the products, as, discussed above. The partial filtered results 210-240 may be stored as shown in FIG. 5 in the indexed order. After all N/2×N/2 blocks of image data are processed by the partial filter result generator 304, the partial filtered results 182 as shown in FIG. 5 is stored in the memory 308.

Not all the partial filtered results 182 may be stored in the memory 308 all at the same time because the filter output generator 306 may begin generating complete filter outputs as soon as the needed partial filtered results 210-240 are available. The CPU 302 may communicate with the partial filter result generator 304 to determine when sufficient number of partial filtered results 210-240 have been generated. When enough partial filtered results 210-240 have been generated, the CPU 302 may instruct the filter output generator 306 to begin generating the complete filter outputs. When any of the partial filtered results 210-240 are not needed for further generation of complete filter outputs, then they may be deleted from the memory 308 to save memory space.

The filter output generator 306 may process the partial filtered results 210-240 in the fast and slow scan directions as shown in FIGS. 6 and 7. Thus, 210 (0 0), 220 (0 1), 230 (1 0) and 240 (1 1) are first accessed to generate the top left most complete filtered output pixel (0 0). The filter output generator 306 cannot begin generating this pixel until 240 (1 1) is generated by the partial filter result generator 304. However, after 240 (1 1) is generated, the filter output generator 306 may generate one complete output pixel for each N/2×N/2 block of image data processed by the partial filter result generator 304. After the complete filter output (0 0) is generated, the partial filtered results 210-240 for the (0 0) N/2×N/2 block of image data may be deleted, because these partial filtered results are, not needed to generated any other complete filter outputs. Similarly, the partial filtered results 210-24-(0 1) may be deleted after the completed filter output (0 1) is generated, and so on.

The complete filter outputs may either be stored in the memory 308 or output through the input/output port 310 to following processes for further processing. In this case, only a relatively small amount of memory is required if the filter device 300 filters the image data in a "on-the-fly" manner. N/2×N/2 blocks of image data effectively stream into the filter device 300 as complete filter outputs stream out of the filter device 300 with un-needed N/2×N/2 blocks of image data and partial filtered results overwritten by new N/2×N/2 blocks of image data and newly generated partial filtered results.

As noted above, the filter processes discussed above may all be implemented by a software program executing in a processor such as the CPU 302. The software program may be stored on a computer readable medium or may be in a carrier wave form encoded to perform the described functions. All the functions of the partial filtered result generator 304 and the filter output generator 306 may be performed by software routines and the memory management of the N/2×N/2 blocks of image data, partial filtered results 210-240 and the quad coefficients 110-140 may be easily performed by software. For example, if the sub-sampling ratio is $k^d$:1 where d is the dimension of the FIR filter, then a memory manager may delete $k^d$ image data pixels that was partial filtered by partial filters (quad filters for d equals to 2) to generate the partial filtered results. Of course this memory management function may also be performed by corresponding hardware devices. The software program may be loaded from a computer readable medium such as a magnetic disk such as a floppy or an optical disk such as a CD, or transmitted electronically via a carrier wave on mediums such as the Internet, for example.

Figure 9:
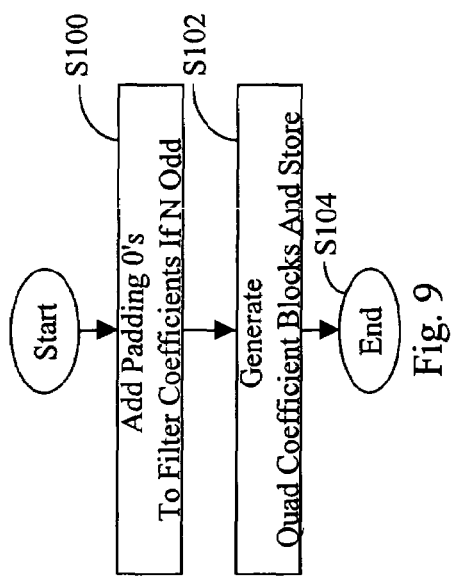
FIGS. 9-11 show exemplary flow charts of the filter process.
Figure 10:
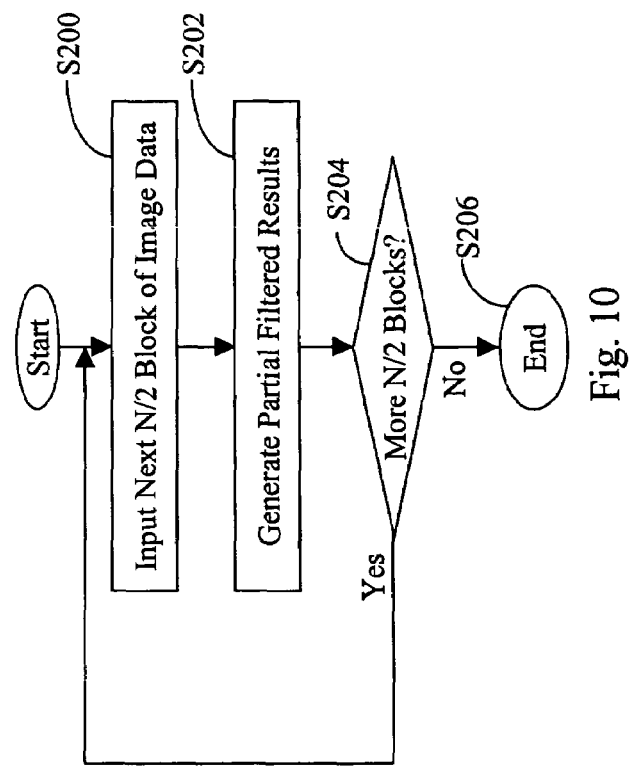
Figure 11:
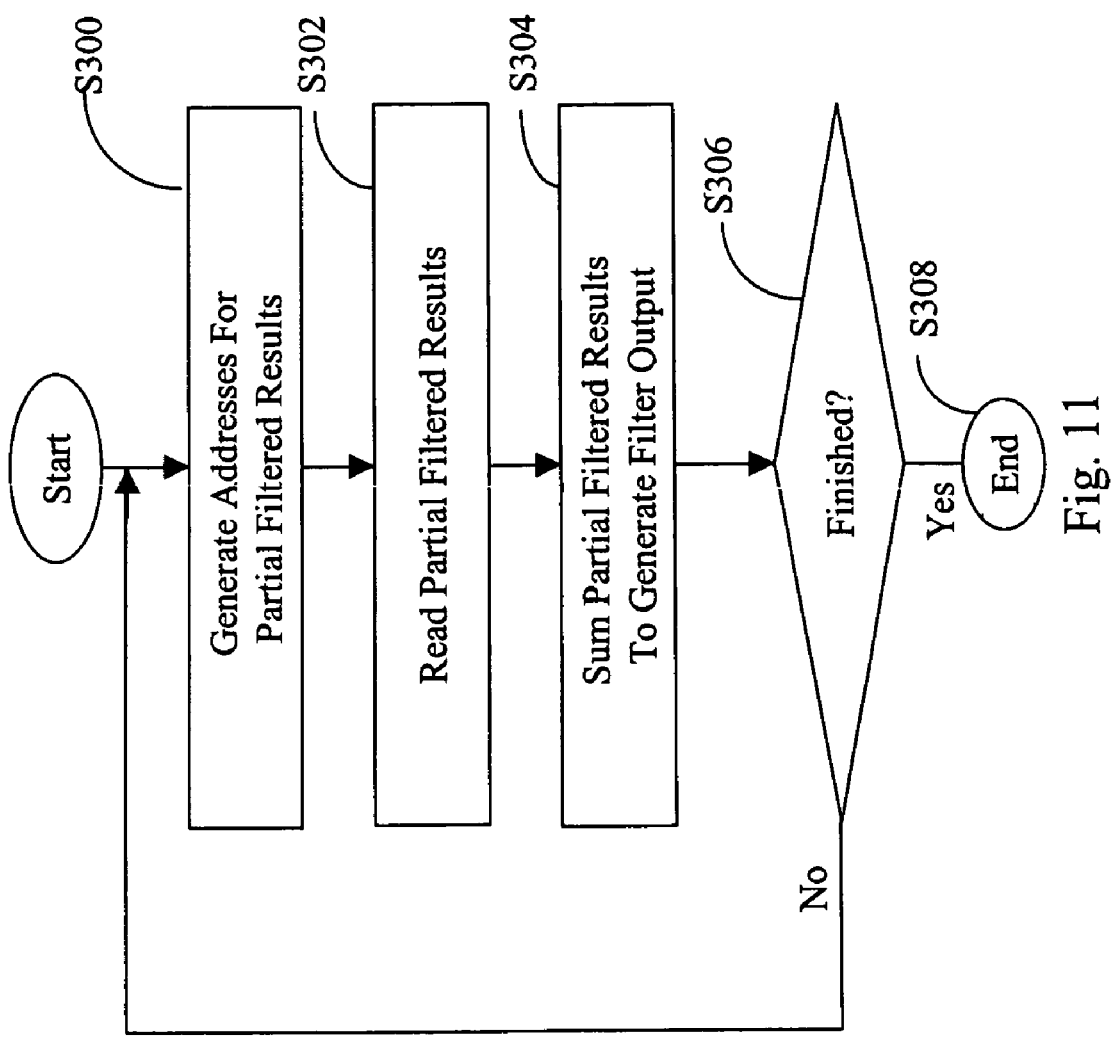

FIGS. 9-11 illustrates exemplary flow charts of the processes that may be executed by a hardware filter device or by a software program. FIG. 9 shows an exemplary process for preparing the quad coefficients. In step S100, zero padding is performed is N is odd. As discussed above, one row and one column of zeros may be attached to the top and left sides or bottom and right sides of the N×N block of coefficients to convert the N×N block of coefficients to an N+1×N+1 block of coefficients. The process goes to step S102. In step S102, the quad coefficients 110-140 are generated and stored in memory 308, for example. Then the process goes to step S104 and ends.

FIG. 10 shows an exemplary flow chart for generating partial filtered results. In step S200, a next N/2×N/2 block of image data is received, and the process goes to step S202. In step 202, the partial filtered results are generated by multiplying each of the quad coefficients with corresponding image data pixels in the N/2×N/2 block. The products corresponding to each of the quad coefficients are summed, and the process goes to step S204. In step S204, the process determines whether more N/2×N/2 blocks of image data are to be processed. If more are to be processed, then the process returns to step S200; otherwise, the process goes to step S206 and ends.

FIG. 11 shows and exemplary process for generating complete filter outputs. In step S300, the process generates address mapping for accessing appropriate partial filtered results corresponding to each of the complete filter output pixels. This address mapping may be easily imbedded into a software program in terms of loops and increments. Corresponding hardware structures in the form of counters and, gates may also be used. If the addressing of appropriate partial filtered results is either embedded in the software or built into hardware, this step may not be necessary. The process goes to step S302.

In step 302, the process reads appropriate one of the partial filtered results and sum the read partial filtered results. The sum is normalized by dividing by a sum of the coefficient values. This division may be performed by right shifting by an exponent of a power of 2 if the sum of the coefficients is the power of 2. If not a power of 2, then a fraction having a power of 2 denominator closest to the sum of the coefficients may be used. The normalized sum may be rounded by adding a value equal to half of the sum of the coefficients before the division process by either right shifting or multiplying by a fraction. The normalized and rounded sum is output as a complete filter output pixel. This normalization and rounding process may be performed by a software program or by a hardware unit (normalizer and a rounding device which may be an ASIC or digital logic, for example) Then the process goes to step S306. In step S306, the process determines whether all the desired complete filter outputs have been generated. If all the desired complete filter outputs have been generated, then the process goes to step S308 and ends; otherwise the process returns to step. S302.

The above described filter process may be used in applications such as xerographic marking devices or digital photocopiers. For example, de-screening of documents from half tone frequencies may be used in these and other applications. In these applications, FIR filters may be used to blur the image data to remove the half tone effects and/or to generate control signals by performing various filtering operations to obtain contrast information, for example. When so applied, an output of a peak and valley detector of the image data may be filtered by a FIR filter and the complete filter outputs may be multiplied by a DotGain parameter to convert the complete filter outputs to frequency units, for example. The application of quad filters may permit speed efficiencies by reducing repeated memory accesses to retrieve the same image data multiple times. Memory requirements may also be reduced a smaller amount of the image data is required to be maintained in memory. The partial filtered results being of much smaller volume.

While the invention has been described in conjunction with exemplary embodiments, these embodiments should be viewed as illustrative, not limiting. For example, while the above discussion used a two-dimensional FIR filter as an example, any FIR filters of any number of dimensions may take advantage of the disclosed benefits. For example, a one dimensional FIR filter having N coefficients may be divided into two half partial filters having N/2 coefficients each. A three dimensional FIR filter may he divided into 6 sixth partial filters. In addition, various modifications, substitutes or the like are possible within the spirit and scope of the invention.

What is claimed is:

1. A filtering method, comprising:
providing a filter that has at least two dimensions, wherein the at least two dimensions have N×N coefficients, and the at least two dimensions include a first dimension and a second dimension;

providing zero padding if N is an odd number, wherein the first dimension is padded with a row of zeroes and the second dimension is padded with a column of zeroes;

dividing the coefficients of the filter into a plurality of partial portions that correspond to a plurality of partial filters;

filtering image data with the plurality of partial filters to generate partial filtered results;

generating complete filter outputs by combining the partial filtered results; and at least one of:
(i) storing the complete filter outputs;
(ii) outputting the complete filter outputs; and
(iii) displaying the complete filter outputs.

2. The method of claim 1, further comprising:

permitting $k^d$ image data pixels used to generate first partial filtered results to be deleted if the $k^d$ image data pixels are no longer needed to generate the complete filter outputs, the $k^d$ image data pixels being deleted, where $k^d$:1 is a sub-sampling ratio and d is a dimension of the filter.

3. The method of claim 2, further comprising:

setting d to 2 and k to N/2 where N is a span of the filter, a number of image data pixels permitted to be deleted between generating consecutive partial filtered results being $(N/2)^2$.

4. The method of claim 1, further comprising:

generating normalized complete filter results by dividing the complete filter results by a sum of the filter coefficients.

5. The method of claim 4, further comprising:

approximating the sum of the filter coefficients by a fraction having a power of 2 denominator;

multiplying each of the complete filter results by a numerator of the fraction to generate a product; and right shifting the product by an exponent of the power of 2 denominator to normalize each of the complete filter results.

6. The method of claim 4, further comprising:

rounding the normalized complete filter results by adding to each of the complete filter results a value equal to half of the sum of the filter coefficients.

7. The method of claim 1, further comprising:

setting the filter coefficients to have a sum equal to a power of 2; and normalizing the complete filter results by right shifting each of its pixels by a number of bits equal to an exponent of the power of 2.

8. A computer readable medium being encoded to perform the method of claim 1.

9. A filter apparatus, comprising:

a first memory storing a filter that has at least two dimensions, wherein the at least two dimensions have N×N coefficients, and the at least two dimensions include a first dimension and a second dimension;

a zero padding device that zero pads the filter if N is an odd number, wherein the zero padding device pads the first dimension with a row of zeroes, and the zero padding device pads the second dimension with a column of zeroes;

a plurality of partial filters coupled to the memory, each of the plurality partial filters corresponding to a portion of the coefficients, the partial filters filtering image data to generate partial filtered results;

a filter output generator combining the partial filtered results to generate complete filter outputs; and at least one of:
(i) a second memory device that stores the complete filter outputs;
(ii) an output device that outputs the complete filter outputs; and
(iii) a display device that displays the complete filter outputs.

10. The filter apparatus of claim 9, further comprising:

a memory manager coupled to the memory, the memory manager deleting $k^d$ image pixels from the memory after each set of partial filtered results are generated, where $k^d$ is a sub-sampling ratio and d is a dimension of the filter.

11. The filter apparatus of claim 9, further comprising:

a complete filter outputs normalizer that normalizes the complete filter outputs by dividing each of the complete filter outputs by a sum of the set of coefficients, the normalizer right shifting each of the complete filter outputs by an exponent of a first power of 2 if the sum of the set of coefficients is the first power of 2, or multiplying each of the complete filter outputs by an integer and right shifting by an exponent of a second power of 2 if the sum of the set of coefficients is not a power of 2.

12. The filter apparatus of claim 11, further comprising:

a rounding device that rounds the normalized complete filter outputs prior to normalizing each of the complete filter outputs by adding to each of the complete filter outputs a value that equals to half of the sum of the set of coefficients.

13. A xerographic marking device using the apparatus of claim 9.

14. A digital photocopier using the apparatus of claim 9.

15. A filter apparatus, comprising:

means for zero padding a filter that has at least two dimensions, wherein the at least to dimensions have N×N coefficients, and the at least two dimensions include a first dimension and a second dimension, the means for zero padding pads the filter if N is an odd number, wherein the means for zero padding pads the first dimension with a row of zeroes, and the means for zero padding pads the second dimension with a column of zeroes;

means for dividing the coefficients of the filter into a plurality of partial portions that correspond to a plurality of partial filters;

means for partial filtering image data to generate partial filtered results based on the partial portions of the coefficients;

means for combining the partial filtered results to generate complete filter outputs; and at least one of;
(i) means for storing the complete filter outputs;
(ii) means for outputting the complete filter outputs; and
(iii) means for displaying the complete filter outputs.

16. The filter apparatus of claim 15, further comprising:

means for deleting $k^d$ image data pixels after the means for partial filtering generates the partial filtered results, where $k^d$:1 is a sub-sampling ratio and d is a dimension of the filter;

means for normalizing the complete filter outputs; and means for rounding normalized complete filter outputs.

* * * * *